United States Patent [19]

Bässler et al.

[11] 4,410,495
[45] Oct. 18, 1983

[54] OZONIZER WITH SLEEVE ELECTRODES

[75] Inventors: Peter Bässler, Bellikon; Ulrich Kogelschatz, Hausen, both of Switzerland

[73] Assignee: BBC Brown, Boveri & Company, Limited, Baden, Switzerland

[21] Appl. No.: 224,698

[22] Filed: Jan. 13, 1981

[30] Foreign Application Priority Data

Jan. 14, 1980 [CH] Switzerland ............... 251/80

[51] Int. Cl.³ ............................................. C01B 13/12
[52] U.S. Cl. ........................ 422/186.18; 422/186.15; 315/170
[58] Field of Search .............. 422/186.07, 186.15, 422/186.18; 315/170

[56] References Cited

U.S. PATENT DOCUMENTS 3,576,733  4/1971  Beitzel ............... 422/186.18
3,730,874  5/1973  Trüb .................. 422/186.15
3,800,210  3/1974  Caussin ............... 422/186.15
3,942,093  3/1976  Lowther .............. 422/186.15
4,138,724  2/1979  Kawauchi ............ 422/186.15

FOREIGN PATENT DOCUMENTS 2921165  11/1980  Fed. Rep. of Germany ........ 422/186.15

Primary Examiner—Leland A. Sebastian
Attorney, Agent, or Firm—Oblon, Fisher, Spivak, McClelland & Maier

[57] ABSTRACT

An ozonizer formed of an interior electrode in the form of an electrically conducting tube arranged concentrically in an electrically insulating tube and spaced at a distance radially therefrom to form a discharge channel. The electrically insulating tube has an exterior surface on which are provided at least two parallel electrically conducting sleeves, which are separated axially relative to one another and surrounding the insulating tube to form the exterior electrode of the ozonizer. Each sleeve is connected respectively by way of a switching element to an energy supply device. The electrically conducting tube is also connected to the energy supply device.

8 Claims, 6 Drawing Figures

OZONIZER WITH SLEEVE ELECTRODES

BACKGROUND OF THE INVENTION

1. Field of the Invention

This invention relates to an ozonizer of the type provided with a pair of electrodes one of which has a surface facing the other electrode covered with a dielectric, which electrodes are connected to an energy supply source and a parallel connected storage capacitor.

2. Description of the Prior Art

Ozonizers are being used in increasing numbers in industrial applications, because ozone is being used as a strong oxidation medium for waste water purification, air quality improvement, drinking water treatment, food storage, as well as in medicine and chemistry.

A method and a device for carrying out corona discharge reactions is known from the German OS 26 17 104 in which a reaction gas is passed through a corona discharging slot and electrical energy in the form of a narrow impulse is generated in the slot. The formation of a corona discharge transfers energy to the electrons and gas ions found in the slot. The electrons are charged with energy in order to produce a productive reaction with the reaction gas. The gas ions created during the reaction are removed from the slot to minimize any unproductive energy deposition to the ions. The elimination of the gas ions is carried out by pre-tension voltage and in the time interval between the narrow impulses. The gas ions can also be neutralized by the admixture of negatively charged, finely distributed liquid and solid particles. A method of ozone production is used, whereby ozone is produced from a gas mixture containing oxygen which contains considerable amounts of moisture and other impurities.

With such a method the impulses are produced by a relatively expensive switch circuit having a switching element which must be able to switch the entire current. The switching elements used to control such pulsating ozonizers must be able to switch voltages of 15 to 20 kV as well as currents from 1 to 5 kA before a discharge has built up between the ozonizer electrodes. In addition, these switching elements must provide a long service life, i.e., up to $10^{10}$ switching cycles are required. Suitable switching elements are, for example, semi-conductor switches such as break-over diodes and amplifying gate thyristors. Their construction and method of operation are described, for example, in the BBC publication D HS 704 68 EFD and in the publication by P. F. Pittman, D. J. Page, Solid State Pulse Switching, Pulsed Power Cont., Lubbock (Tex), 1977. These switching elements are able to handle the required current increases at a magnitude of $10^9$ A/S. Their electric strength, which is at 1 kV, is not sufficient, however. Therefore, switches were suggested and patents applied for with which the switching element needs only a small current increase which is imposed over a slower fundamental oscillation. (See U.S. application Ser. No. 174,259 filed July 31, 1980).

Another disadvantage is the limited current-carrying capacity of the break-over diodes, which can switch at an optimum current of 100 to 200 A per element. It is advantageous to have relatively high current densities on the ozonizer electrodes, c. 1 A per $cm^2$ of electrode surface to improve the yield of ozone. This is due to the fact that a homogeneous discharge is not produced until these conditions are achieved. An ozone tube, 1 m in length has an electrode surface of approximately 1600 $cm^2$. Eight to 16 parallel break-over diodes are necessary. Each switches 100 to 200 A to the electrodes in order to produce the necessary current density on the electrodes with such an ozonizer. The ignition current of the individual parallel break-over diodes varies, however, from element to element. Therefore, additional switching measures are needed to assure synchronized switching of the trip diodes and a uniform distribution of the current to the switching elements. Without these additional switching measures a portion of the trip diodes would be overloaded and destroyed.

SUMMARY OF THE INVENTION

Accordingly, one object of this invention is to provide a novel ozonizer of the above noted type in which optimal current densities for economical ozone production can always be achieved.

These and other objects are achieved according to the invention by providing a new and improved ozonizer provided with at least two electrodes of which at least one electrode has a surface facing the other electrode which is covered by a dielectric, in which the ozonizer is connected to an energy supply device formed of a current source and a parallel connected storage capacitor, wherein the current source has a first connecting terminal connected with one electrode of the ozonizer and a second connecting terminal connected by way of at least one switching element with the other electrode of the ozonizer. According to the invention, at least one electrode includes plural partial electrodes each separated from one another and each having at least one respective switching element, in which each partial electrode with its associated switching element is connected in parallel to the current source of the energy supply device. As a result, the ozonizer electrodes can produce a homogenous discharge therebetween, while the partial currents needed for producing the discharge are conveyed to the electrodes by way of switching elements which are not overloaded in the process. Furthermore, according to this construction it is not necessary to synchronously switch the switching elements.

By using spark gap switching elements to produce the required discharge between the ozonizer electrodes, rapid response in the high current load levels are attainable. The use of semi-conductor switching elements furthermore result in an extremely long service life and enables rapid switching in the range of nanoseconds. Similarly, the use of break-over diodes as switching elements enables reliable and reproducable current switching because the trigger voltage for an individual break-over diode switching element varies only a little more than 5 V.

In one embodiment of the invention, switching elements in the form of an anti-parallel connection of one or more series connected break-over diodes is possible to switch a total voltage mounting to 20 kV. By bridging a switching element with a switching capacitor, it is possible to use switching elements with less voltage capability, since in this instance the switching element must only switch the additional voltage increase. By placing a storage capacitor directly adjacent to the ozonizer according to another characteristic of the invention, the current transfer from the current source to the ozonizer electrodes is improved and losses such as occur when longer supply leads are used can be extensively avoided.

In a preferred embodiment of the invention, the ozonizer is constructed in tubular form with an electrically conductive inner tube forming one of the electrodes, an electrically insulating tube extending in a radial direction at a distance from the inner tube and having an axis parallel thereto forming the dielectric, and plural self contained parallel strips of electrically conducting material formed surrounding the insulating tube on an outer surface thereof to form the other ozonizer electrode, wherein the electrically conductive parallel strips are spaced at a distance from one another in the direction of the longitudinal axis of the insulating tube.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
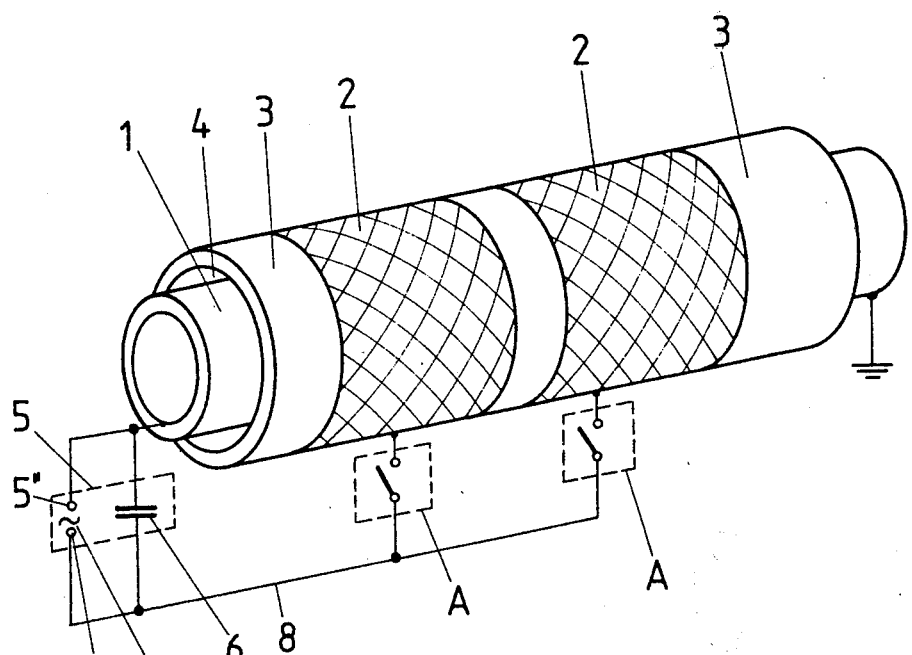
FIG. 1 is a schematic diagram of an ozonizer according to the invention in which one ozonizer electrode consists of two ring-shaped collars of electrically conducting material which are electrically separated from one another.

Referring now to the drawings, wherein like reference numerals designate identical or corresponding parts throughout the several views, and more particularly to FIG. 1 thereof, there is shown an electrically conducting tube 1, e.g., of steel, arranged in an electrically insulating tube 3, e.g., of glass, at a distance perpendicular to the longitudinal axis and parallel thereto to form a discharge channel 4.

The electrically conducting tube 1 forms the interior electrode of the ozonizer. The exterior surface of the electrically insulating tube 3 has two partial electrodes 2 which form the exterior electrodes of the ozonizer. They consist of parallel, electrically conducting sleeves 2, e.g., of copper or aluminum, which surround the electrically insulating tube 3 around its periphery and are spaced in the direction of the longitudinal axis of tube 3 at a given distance from one another. The sleeves 2 can be attached to the tube 3 by lacquer or by metal vaporization, for example. The effective surface of a sleeve 2 amounts to approximately 100 to 200 cm$^2$. Each sleeve 2 is connected by a switch element A with a connecting lead 8 which is connected to a terminal 5" of an alternating current source 5'. The second terminal 5" of the alternating current source 5' is connected with one end of the electrically conducting tube 1 whose other end is grounded. The terminals of the alternating current source 5' are bridged by a storage capacitor 6, which is located in the immediate vicinity of the ozonizer. The storage capacitor 6 and the alternating current source 5' form the energy supply source 5 for the ozonizer.

Figures 1A, 1B, 1C:
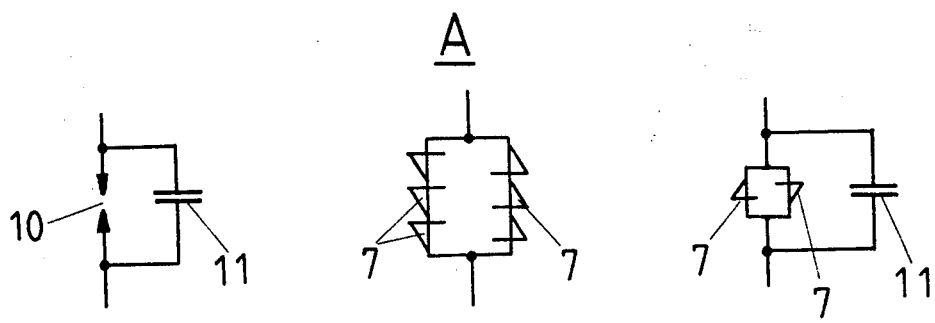
FIGS. 1a, 1b, 1c are schematic circuit diagrams of switching assemblies which can be preferrably used as switch elements.

The arrangement shown in FIG. 1a consists of a gap 10 which is bridged with a switching capacitor 11. The switch element A according to FIG. 1b consists of two groups each having three series switches 7 connected anti-parallel with one another. With the arrangement shown in FIG. 1c two break-over diodes 7 are connected anti-parallel. This anti-parallel connection is bridged by a switching capacitor 11.

The manner of operation of the ozonizer of the invention is as follows:

A gas mixture containing an oxygen mixture or pure oxygen flows through the discharge channel 4. The storage capacitor 6 is charged during the positive half cycle of the alternating current cycle with a given charge from the alternating current source. Upon reaching a given current value, the switch element A switches, and the storage capacitor 6 discharges itself through the discharge channel by way of switch element A and the electrically conducting sleeve 2. The discharge is homogenous due to the achievable high current densities of c.1 A/cm$^2$. This causes the oxygen to ionize and produces ozone as a result with a high degree of effectiveness. During the negative half cycle of the alternating current the process described above repeats itself. Use of the switch element shown in FIG. 1a and suitable dimensioning of the ozonizer and the switch capacitor 11 can distribute the voltage provided by the alternating current source 5' in such a manner to the ozonizer, which is functioning as a capacitor, and the switching capacitor 11, that only a relatively small voltage impulse needs to be added over the gap 10 in order to trigger the discharge. This applies equally to the use of the switching element shown in FIG. 1c. In this case a break-over diode and a unipolar switch element are provided for the positive and negative polarity respectively. With the switch element illustrated in FIG. 1b, the full voltage needed to trigger the discharge can be switched to the partial electrodes 2 of the ozonizer. In place of the break-over diodes 7 other semiconductor switch elements can be used, e.g., amplifying gate thyristors. The electrically conducting tube 1 can be cooled from the inside by water, and the electrically insulating tube 3 can be disposed, along with the switching elements, in an oil bath.

Figure 2:
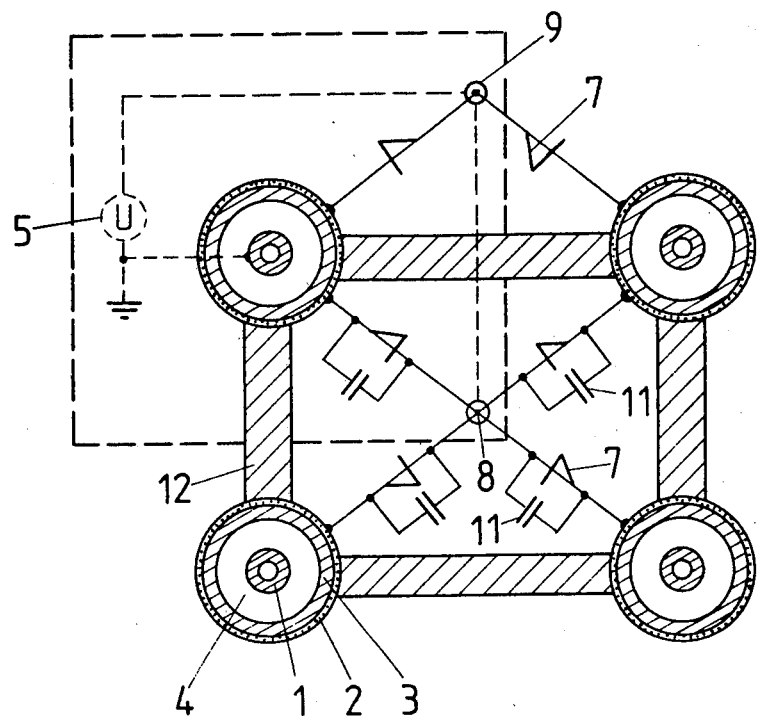
FIG. 2 is a schematic diagram of numerous ozonizers according to the invention which are interconnected to form a larger ozonizer unit.

With an ozonizer unit shown in FIG. 2, several ozonizers according to the invention are connected together by support beams 12 formed of electrically insulating material, e.g., plastic. The exterior electrodes 2 of the ozonizers are connected respectively by way of a parallel combination of a break-over diode 7 and a switch capacitor 11 to a first partial lead 8 of the connecting lead to a pole of the energy supply device 5. At another point of the respective exterior electrodes 2 of the ozonizer, an additional trip diode is attached in each case which is connected anti-parallel to the break-over diode, which is bridged by the switch capacitor 11 and is attached to a second partial lead 9 of the connecting lead to the energy supply device 5. The interior electrodes 1 of the ozonizer are grounded and connected to the other pole of the energy supply device 5.

Figure 3:
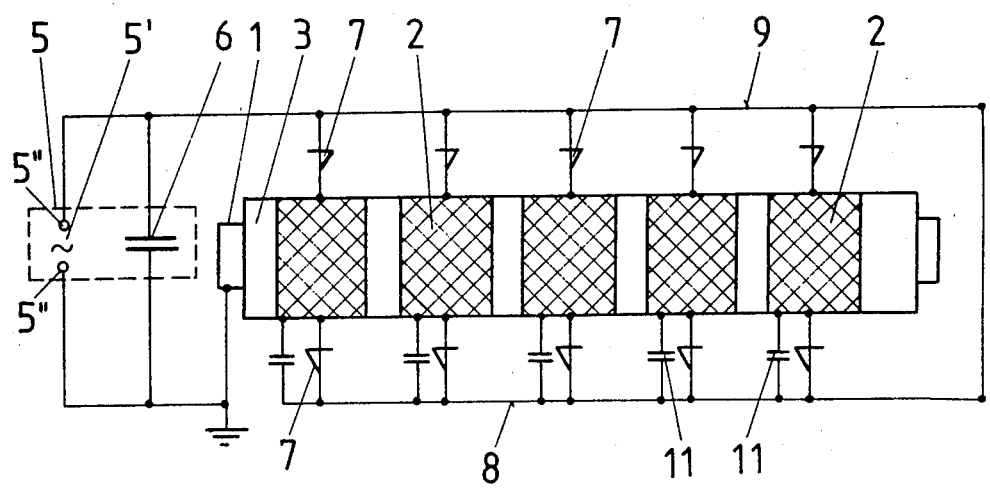
FIG. 3 is a schematic diagram of an ozonizer provided with an ozonizer electrode formed of several ring-shaped collars or sleeves of electrically conducting material which are electrically separated from one another.

One of the ozonizers (enclosed by a dotted line in FIG. 2), with the switching connections belonging to it, is shown in FIG. 3 to illustrate the switching device.

Its construction corrresponds extensively to that of the ozonizer according to FIG. 1 and can be understood from the description for FIG. 1. The electrically insulating tube 3, however, is not provided with two, but rather a plurality of electrically conducting sleeves 2. The switching elements associated with the individual sleeves 2 correspond to the switching elements illustrated in FIG. 1c as far as their manner of operation is concerned, whereby in each case a parallel connection of break-over diodes 7 and switch capacitor 11 connects the sleeve 2 with a first connecting lead 8 to the energy supply device 5, and a trip diode 7, connected anti-parallel and attached at another point of the sleeve 2, connects the sleeve 2 with a second connecting lead 9 of the energy supply device 5.

The manner in which the ozonizer unit and the ozonizer shown in FIG. 3 operate can be taken from the description for FIG. 1 and FIG. 1c.

The power supply for the ozonizer as described is not limited to alternating current, but can also be provided by pulsating current.

Obviously, numerous modifications and variations of the present invention are possible in light of the above teachings. It is therefore to be understood that within the scope of the appended claims, the invention may be practiced otherwise than as specifically described herein.

We claim:

1. An ozonizer provided with at least two electrodes of which at least one has a surface facing the other electrode and covered with a dielectric, said ozonizer connected to an energy supply device formed of a current source and a parallel connected storage capacitor, said current source having a first connecting terminal connected with one electrode of the ozonizer and a second connecting terminal connected by way of at least one switching element with the other electrode of the ozonizer, wherein at least one electrode comprises:
   plural partial electrodes, each separated from one another and having at least one associated switching element, and
   each partial electrode having an associated switching element connected in parallel to the current source.

2. An ozonizer according to claim 1, wherein the switching element comprises:
   a spark gap.

3. An ozonizer according to claim 1, wherein the switching element comprises:
   a semi-conductor element.

4. An ozonizer according to claim 1, wherein the switching element comprises:
   a break-over diode.

5. An ozonizer according to claim 4, wherein the switching element comprises:
   a pair of parallel connected diode circuits, each circuit including at least one break-over diode having an anode and a cathode, wherein the anode of said at least one break-over diode in one diode circuit is connected to the cathode of the at least one break-over diode in the other diode circuit, and vice versa.

6. An ozonizer according to claims 1, 2, 3, 4 or 5, further comprising:
   at least one switching capacitor bridging one of said switching elements.

7. An ozonizer according to claim 1, wherein the storage capacitor is located in the immediate vicinity of the ozonizer.

8. An ozonizer according to claim 1, further comprising:
   an electrically conductive inner tube forming one of said electrodes;
   an electrically insulating tube extending in radial direction at a distance from the inner tube and having an axis parallel to that of the inner tube; and
   said insulating tube provided with self-contained parallel strips of electrically conducting material forming the other electrode and which are spaced at a distance from one another in the direction of the longitudinal axis of the electrically insulating tube and surrounding said insulating tube.

* * * * *